No. 691,374. Patented Jan. 21, 1902.
O. H. HANSEN.
BICYCLE LOCK.
(Application filed Sept. 23, 1901.)
(No Model.)

Witnesses.
A. H. Keeney
Anna V. Faust

Inventor:
Oswald H. Hansen
By Benedict & Morsell
Attorneys

THE NORRIS PETERS CO., PHOTO-LITHO., WASHINGTON, D. C.

UNITED STATES PATENT OFFICE.

OSWALD H. HANSEN, OF MILWAUKEE, WISCONSIN.

BICYCLE-LOCK.

SPECIFICATION forming part of Letters Patent No. 691,374, dated January 21, 1902.

Application filed September 23, 1901. Serial No. 76,156. (No model.)

*To all whom it may concern:*

Be it known that I, OSWALD H. HANSEN, residing at Milwaukee, in the county of Milwaukee and State of Wisconsin, have invented a new and useful Improvement in Bicycle-Locks, of which the following is a description, reference being had to the accompanying drawings, which are a part of this specification.

My invention has relation to improvements in bicycle-locks.

The object of the invention is to provide an improved construction of lock adapted when the machine is not being ridden to be thrown into engagement with the sprocket-chain, and hence thereby prevent any transmission of force from the propelling power, and when it is desired to propel the machine said locking mechanism adapted by a simple adjustment to be thrown out of locking engagement with the sprocket-chain.

A further object had in view is the provision of simple means for attaching the locking mechanism to and detaching the same from the frame of the bicycle.

With the above primary and other incidental objects in view the invention consists of the devices and parts or their equivalents, as hereinafter set forth.

Figure 1:
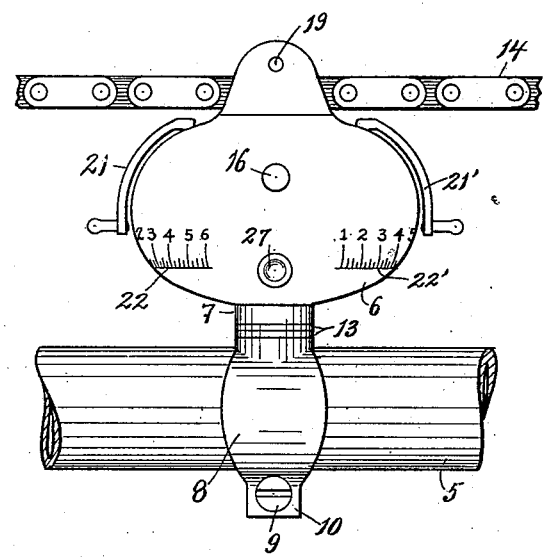
Figure 2:
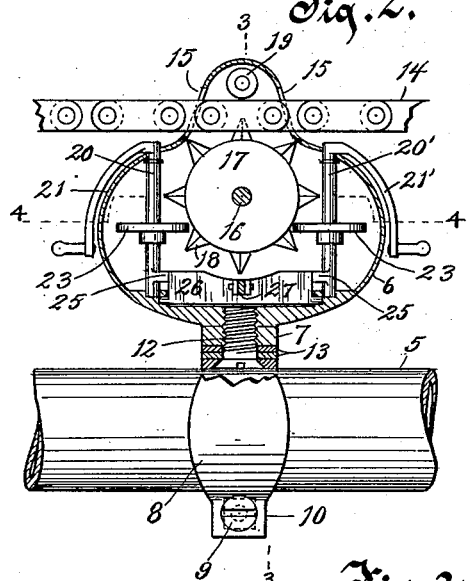
Figure 3:
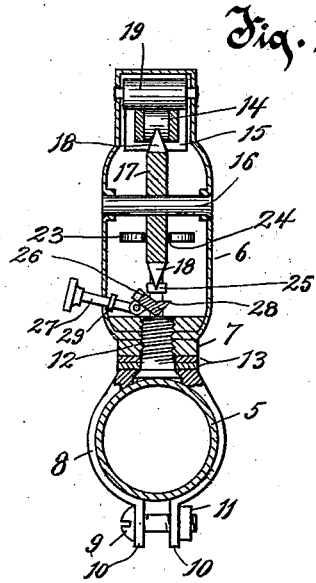
Figure 4:
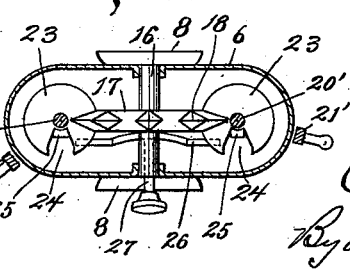

In the accompanying drawings, Figure 1 is a side elevation showing my improved locking mechanism applied to one of the lower rear-fork members of the bicycle-frame. Fig. 2 is a similar view to Fig. 1, but showing the casing of the locking mechanism in section. Fig. 3 is a vertical sectional view on the line 3 3 of Fig. 2, and Fig. 4 is a horizontal sectional view on the line 4 4 of Fig. 2.

Referring to the drawings, the numeral 5 indicates one of the members of the lower rear fork of the bicycle-frame to which my improved locking mechanism is secured. This locking mechanism is inclosed in an outer casing 6 of any desirable form, but preferably of the form shown in the accompanying drawings. Projecting from the under side of this casing is an interiorly-threaded tube 7. A bowed clamping-spring 8 is adapted to embrace the member 5 of the rear fork and is tightly clamped thereto by means of a bolt 9, passed through registering openings in flanges 10 10, depending from the clamping members, said bolt having a head at one end and having its opposite end threaded to receive a nut 11, which nut when turned in one direction acts to draw the ends of the clamping members together. From the upper side of the bowed clamping-spring extends a threaded stem 12, which is adapted to be screwed into the tube 7, and thereby connect the casing of the locking mechanism to the clamp. This stem may be in the form of an ordinary screw turned through the clamping member and into the tube 7, as shown in the drawings. Washers 13 may be interposed between the upper side of the clamp and the under side of the tube 7 in order to elevate the locking mechanism the required distance to engage the sprocket-chain 14, said sprocket-chain passing through oppositely-arranged openings 15 15 in the upper projecting portion of the casing.

Journaled in the sides of the casing is a shaft 16, and on this shaft is mounted a wheel 17, said wheel having a series of teeth 18 projecting peripherally therefrom. These teeth are preferably of pyramidal form in cross-section, so as to be readily engaged by the teeth of the sprocket-chain when said sprocket-chain is put in motion. It will therefore be understood that the wheel 17 is so disposed below the sprocket-chain that when the bicycle is in motion the sprocket-chain will act on the teeth of the wheel and thereby rotate the same. It will be understood also that the locking mechanism is adjusted so as to permit free rotation of the wheel 17 only when it is desired that the bicycle shall be propelled. The sprocket-chain is prevented from jumping upwardly in the casing by means of an antifriction-roller 19, mounted in the upper portion of the casing above the sprocket-chain.

Journaled in the casing on opposite sides of the periphery of the wheel 17 are upright shafts 20 20'. The upper ends of these shafts extend through the casing a slight distance, and these projecting ends are formed or provided with handles or crank-arms 21 21'. The free ends of these handles or crank-arms are adapted, respectively, to work over graduated scales 22 22', marked on the outside of the casing, as clearly shown in Fig. 1. I show these scales in inch measurements, each scale indicating six inches. Mounted medially upon each of the upright shafts 20 20' are disks 23 23, the periphery of each of said disks being provided with an inwardly-extending recess 24. Each upright shaft is provided near its lower end with a laterally-extending lug 25.

Within the lower portion of the casing and between the upright shafts is a pivoted plate 26, the pivots or pintles being at the lower corners of said plate. Pivoted to and extending from one face of this plate is a pull-rod 27, said rod extending freely through an opening therefor in the casing, and being provided on its outer end with an enlargement or head for convenience in pressing the finger thereagainst. The rear face of the plate 26 at the lower edge thereof is provided with a projecting foot 28, which when the plate is thrown upwardly is adapted to rest on the metal in the bottom of the casing and thereby support the plate in an upright position. When the plate is in this upright position and when the handles 21 21' are turned to a certain position, the opposite ends of said plate will engage the ends of the lugs 25 of the upright shafts 20 20', as clearly shown in Fig. 2; and hence prevent said shafts from turning.

In the operation of my invention if it is desired that the sprocket-chain shall run freely, so as to permit a person to ride the machine, the handles 21 21' are turned to such position as to bring the recesses 24 of the disks 23 in position to permit the teeth 18 of the wheel 17 to pass freely through said recesses. The extent of the turning of the handles to effect this result is determined by the scale measurements on the outside of the casing. For instance, the parts may be so regulated that when the handles 21 is turned to the "4" mark on the scale 22 then the upright shaft 20 will be turned sufficiently far to bring the recess of the disk 23 relating thereto in proper position to permit the teeth 18 to pass freely therethrough, and when the handle 21' is turned to the "3" mark on the scale 22' the upright shaft 20' will have been turned sufficiently far to bring the recess of its disk in position to permit said teeth 18 to pass therethrough. It is desirable that the two handles be turned to different points on the scales, so as preclude the possibility of a person readily obtaining the combination merely by experiment. When the disks are turned so as to permit the teeth 18 to pass therethrough as the wheel 17 is revolved, it is necessary that said disks should be held securely in that position, as should there be an accidental turning of the upright shafts sufficient to throw the recesses of the disks out of alinement with the teeth 18 it would result in said teeth striking the solid portions of the disks, and thereby locking the sprocket-chain, and consequently bringing the machine to a sudden standstill. It is for this reason that I provide the lugs 25 and the pivoted plate 26, which lugs when the upright shafts are turned so as to bring the recesses of the disks in line with the teeth and when the plate 26 is in an upright position are in line to be engaged by the ends of said plate, and consequently the upright shafts are securely locked or wedged against accidental turning. When the rider dismounts and it is desired to lock the machine, the rod 27 is pulled outwardly, as indicated in Fig. 3, the extent of outward pulling being limited by a stop 29 on said rod, and this pulling outwardly of the rod causes the pivoted plate 26 to be turned forwardly out of line with the lugs 25, and hence the upright shafts 20 20' are free to be turned by the handles 21 21' until the recesses of the disks 23 are out of line with the teeth 18. When so turned, it is obvious that the wheel 17 cannot be rotated, owing to the fact that the teeth 18 thereof, will strike against the solid portions of the disk 23, and hence the sprocket-chain is effectually locked against movement. The extent to which the shafts are turned to effect the result just stated is also determined by the scales—that is to say, the handle 21 may be turned to a certain indicated point on the scale 22 and the handle 21 to a certain indicated point on the scale 22'.

It will be seen that my device can be readily connected to and disconnected from the bicycle-frame. In order to connect to the fork member 5, it is only necessary to adjust the clamp 8 thereto and draw up on the bolt 9. The sprocket-chain can then be passed through the openings 15 15 and adjusted around the sprocket-wheel, and then the ends of said chain connected. In removing the locking mechanism from the machine it is only necessary to disconnect the ends of the sprocket-chain and then draw said chain through the openings 15 and out of engagement with the casing, and then by releasing the bolt 9 the entire locking mechanism is capable of being disengaged from the bicycle.

While I have shown two of the upright shafts and two of the disks 23, yet I do not wish to be understood as limiting myself thereto, inasmuch as only one of said shafts and disks might be used and successful results obtained without departing from the spirit and scope of my invention. I prefer, however, to employ the construction shown in the drawings, inasmuch as thereby the parts can be adjusted so that it is necessary for the two handles to be turned to different points of the scales in order to effect the locking and unlocking.

What I claim as my invention is—

1. In a bicycle-lock, the combination of a casing secured to the frame of a bicycle, a normally rotatable wheel in said casing and provided with projecting teeth engaged by the teeth of the sprocket-chain of the bicycle, and means for locking said wheel so as to prevent rotation thereof.

2. In a bicycle-lock, the combination of a casing secured to the frame of a bicycle, a wheel rotatable in said casing and provided with projecting teeth adapted to be engaged by the teeth of the sprocket-chain of the bicycle, an upright shaft in the casing, a disk mounted on the shaft, said disk provided with a recess extending inwardly from the periphery thereof, and means for rocking the shaft so as to bring the recess of the disk into and out of alinement with the teeth of the wheel.

3. In a bicycle-lock, the combination of a casing secured to the frame of a bicycle, a wheel rotatable in said casing and provided with projecting teeth adapted to be engaged by the teeth of the sprocket-chain of the bicycle, an upright shaft in the casing, a disk mounted on said shaft and having a recess extending inwardly from the periphery thereof, means for rocking the shaft so as to bring the recess of the disk into and out of alinement with the teeth of the wheel, and means for holding the shaft against turning when the recess of the disk is in alinement with the teeth of the wheel.

4. In a bicycle-lock, the combination of a casing secured to the frame of a bicycle, a wheel rotatable in said casing and provided with projecting teeth adapted to be engaged by the teeth of the sprocket-chain of the bicycle, an upright shaft in the casing, the upper end of said shaft extending through the casing and provided with a crank-handle exterior of said casing, and a disk mounted on the shaft, said disk provided with a recess extending inwardly from the periphery thereof, the said recess of the disk, when the disk is rotated by the upright shaft to a certain position in one direction, adapted to be brought into alinement with the teeth of the wheel, and said recess of the disk, when the disk is rotated by the upright shaft to a certain position in the opposite direction, adapted to be brought out of alinement with the teeth of the wheel.

5. In a bicycle-lock, the combination of a casing secured to the frame of a bicycle, said casing provided exteriorly with a graduated scale, a wheel rotatable in the casing and provided with projecting teeth adapted to be engaged by the teeth of the sprocket-chain of the bicycle, an upright shaft in the casing, the upper end of said shaft extending through the casing and provided with a crank-handle exterior of the casing, said crank-handle adapted to work over the graduated scale of the casing, and a disk mounted on the shaft and provided with a recess extending inwardly from the periphery thereof, the said recess adapted, when the disk is rotated by the upright shaft to a certain indicated scale position in one direction, to be brought into alinement with the teeth of the wheel, and said recess of the disk adapted when said disk is rotated by the upright shaft to a certain indicated scale position in the opposite direction, to be brought out of alinement with the teeth of the wheel.

6. In a bicycle-lock, the combination of a casing secured to the frame of a bicycle, a normally rotatable wheel in said casing and provided with projecting teeth adapted to be engaged by the teeth of the sprocket-chain of the bicycle, upright shafts in the casing, disks mounted on said shafts, each disk provided with a recess extending from the periphery thereof inwardly, and means for rocking said shafts so as to bring the recesses of the disks into and out of alinement with the teeth of the wheel.

7. In a bicycle-lock, the combination of a casing secured to the frame of a bicycle, a normally rotatable wheel in said casing, and provided with projecting teeth adapted to be engaged by the teeth of the sprocket-chain of the bicycle, upright shafts in the casing, disks mounted on said shafts, each disk provided with a recess extending from the periphery thereof inwardly, and means for imparting variable rocking motions to said shafts, said variable rocking motions in one direction turning the shafts the required distances to bring the recesses of the disks into alinement with the teeth of the wheel, and the variable rocking motions in the opposite direction bringing the recesses of the disks out of alinement with the teeth of the wheel.

8. In a bicycle-lock, the combination of a casing secured to the frame of a bicycle, said casing provided exteriorly with graduated scales, a normally rotatable wheel in the casing and provided with projecting teeth adapted to be engaged by the teeth of the sprocket-chain of the bicycle, upright shafts in the casing, said shafts having their upper ends extending through the casing, crank-arms or handles connected to said upper ends of the shafts and working over the graduated scales, disks mounted on the upright shafts, each disk provided with a recess extending inwardly from the periphery thereof, the recesses of said disks, when the disks are turned to a certain extent by the upright shafts as indicated by the graduated scales, adapted to be brought into and out of alinement with the teeth of the wheel, in accordance with the direction of the turning of said disks.

9. In a bicycle-lock, the combination of a casing secured to the frame of a bicycle, a wheel rotatable in said casing and provided with projecting teeth adapted to be engaged by the sprocket-chain of the bicycle, an upright shaft in the casing, said shaft provided with a projecting lug, a disk mounted on the shaft and having a recess extending inwardly from its periphery, means for rocking said shaft so as to bring the recess of the disk into and out of alinement with the teeth of the wheel, a pivoted plate in the casing, and means for turning said plate to and from an upright position, the end of the plate, when said plate is turned to an upright position, and when the upright shaft is turned to a position to bring the recess of the disk in alinement with the teeth of the wheel, adapted to engage against the lug of the upright shaft and thereby hold the disk in adjusted position.

10. In a bicycle-lock, the combination of a casing secured to the frame of a bicycle, a wheel rotatable in said casing and provided with projecting teeth adapted to be engaged by the sprocket-chain of the bicycle, an upright shaft in the casing, said shaft provided with a projecting lug, a disk mounted on the shaft and having a recess extending inwardly from its periphery, means for rocking the shaft so as to bring the recess of the disk into and out of alinement with the teeth of the wheel, a pivoted plate in the casing, and a pull-rod secured to said plate and extending outwardly therefrom through the casing, said rod when manipulated adapted to turn the plate to and from an upright position, the end of the plate, when said plate is turned to an upright position, and when the upright shaft is turned to a position to bring the recess of the disk into alinement with the teeth of the wheel, adapted to engage against the lug of the upright shaft and thereby hold the disk in adjusted position.

11. In a bicycle-lock, the combination of a casing secured to the frame of a bicycle, a wheel rotatable in the casing and provided with projecting teeth adapted to be engaged by the sprocket-chain of the bicycle, upright shafts in the casing, each of said shafts provided with a projecting lug, a disk mounted on each upright shaft, each disk having a recess extending inwardly from its periphery, means for rocking said shafts so as to bring the recesses of the disks into and out of alinement with the teeth of the wheel, a pivoted plate in the casing, and means for turning said plate to and from an upright position, the ends of the plate, when said plate is turned to an upright position, and when the upright shafts are turned to a position to bring the recesses of the disks into alinement with the teeth of the wheel, adapted to engage against the lugs of the upright shafts and thereby hold the disks in adjusted position.

12. In a bicycle-lock, the combination of a clamp adapted to be clamped to one of the tubes of the bicycle-frame, a threaded stem extending upwardly from the clamp, a casing provided with a depending threaded portion which the threaded stem of the clamp is adapted to engage, a normally rotatable wheel in the casing, and provided with projecting teeth adapted to be engaged by the teeth of the sprocket-chain of the bicycle, and means for locking said wheel so as to prevent rotation thereof.

In testimony whereof I affix my signature in presence of two witnesses.

OSWALD H. HANSEN.

Witnesses:
A. L. MORSELL,
ANNA V. FAUST.